(12) United States Patent
Ito

(10) Patent No.: US 6,377,363 B1
(45) Date of Patent: Apr. 23, 2002

(54) IMAGE FORMING APPARATUS

(75) Inventor: Takashi Ito, Okazaki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/276,505

(22) Filed: Mar. 25, 1999

(30) Foreign Application Priority Data

Mar. 26, 1998 (JP) .......................................... 10-096987

(51) Int. Cl.$^7$ .......................... H04N 1/32; H04N 1/36; H04N 1/04; G03B 27/52
(52) U.S. Cl. ...................... 358/468; 358/412; 358/481; 355/40
(58) Field of Search ............................... 355/40; 399/13, 399/31, 38, 42, 81, 110; 358/401, 406, 409, 442, 443, 468, 486, 481, 412, 420, 509, 300

(56) References Cited

U.S. PATENT DOCUMENTS

| | | | | |
|---|---|---|---|---|
| 5,001,567 A | * | 3/1991 | Atobe | 358/300 |
| 5,477,342 A | | 12/1995 | Sato | 358/481 |
| 5,661,574 A | * | 8/1997 | Kawana | 388/501 |
| 5,757,926 A | * | 5/1998 | Nagashima et al. | 380/51 |
| 5,839,039 A | * | 11/1998 | Yamada | 399/298 |
| 6,064,492 A | * | 5/2000 | Eldgridge et al. | 358/1.15 |

FOREIGN PATENT DOCUMENTS

| | | |
|---|---|---|
| JP | 04013364 | 1/1992 |
| JP | 04296779 | 10/1992 |
| JP | 05130335 | 5/1993 |
| JP | 05197263 | 6/1993 |
| JP | 05208522 | 8/1993 |
| JP | 06143698 | 5/1994 |

* cited by examiner

*Primary Examiner*—Russell Adams
*Assistant Examiner*—Rodney Fuller
(74) *Attorney, Agent, or Firm*—McDermott, Will & Emery

(57) ABSTRACT

An image forming apparatus is composed of an image forming unit and a main controlling unit. The user can combine the image forming unit and main controlling unit of different types having different printing conditions such as image clock frequency, system speed and printing start timing, etc. Information items for determining resolution, image clock frequency, system speed time up to the beam generation timing from the horizontal synchronizing signal, time up to the beam generation timing from the vertical synchronizing signal and number of rotations of an optical beam deflecting device are shared with the main controlling unit and image forming unit through communication.

20 Claims, 15 Drawing Sheets

FIG. 12

COMBINATION OF MAIN CONTROLLING UNIT A AND IMAGE FORMING UNIT A

| RESOLUTION R (dpi) | IMAGE CLOCK FREQUENCY F (MHz) | NUMBER OF POLYGON MIRROR ROTATION Np (rps) | SYSTEM SPEED Vs (mm/sec) | HORIZONTAL DIRECTION PRINTING START TIMING Th (μsec) | VERTICAL DIRECTION PRINTING START TIMING Tv (msec) | COMPULSORY LASER EMISSION TIMING Ton (μsec) |
|---|---|---|---|---|---|---|
| 600 | 18.0 | 256.6 | 86.9 | 48.7 | 31.3 | 443.4 |
| 400 | 8.0 | 171.0 | 86.9 | 73.1 | 31.3 | 665.0 |

FIG. 13

COMBINATION OF MAIN CONTROLLING UNIT A AND IMAGE FORMING UNIT B

| RESOLUTION R (dpi) | IMAGE CLOCK FREQUENCY F (MHz) | NUMBER OF POLYGON MIRROR ROTATION Np (rps) | SYSTEM SPEED Vs (mm/sec) | HORIZONTAL DIRECTION PRINTING START TIMING Th (μsec) | VERTICAL DIRECTION PRINTING START TIMING Tv (msec) | COMPULSORY LASER EMISSION TIMING Ton (μsec) |
|---|---|---|---|---|---|---|
| 600 | 18.0 | 224.5 | 76.0 | 83.5 | 42.4 | 506.7 |
| 400 | 8.0 | 149.7 | 76.0 | 125.3 | 42.4 | 760.0 |

FIG. 14

COMBINATION OF MAIN CONTROLLING UNIT B AND IMAGE FORMING UNIT A

| RESOLUTION R (dpi) | IMAGE CLOCK FREQUENCY F (MHz) | NUMBER OF POLYGON MIRROR ROTATION Np (rps) | SYSTEM SPEED Vs (mm/sec) | HORIZONTAL DIRECTION PRINTING START TIMING Th (μsec) | VERTICAL DIRECTION PRINTING START TIMING Tv (msec) | COMPULSORY LASER EMISSION TIMING Ton (μsec) |
|---|---|---|---|---|---|---|
| 600 | 15.0 | 213.8 | 72.4 | 21.4 | 32.8 | 532.0 |
| 400 | 15.0 | 320.7 | 162.9 | 39.0 | 23.7 | 354.7 |

FIG. 15

COMBINATION OF MAIN CONTROLLING UNIT B AND IMAGE FORMING UNIT B

| RESOLUTION R (dpi) | IMAGE CLOCK FREQUENCY F (MHz) | NUMBER OF POLYGON MIRROR ROTATION Np (rps) | SYSTEM SPEED Vs (mm/sec) | HORIZONTAL DIRECTION PRINTING START TIMING Th (μsec) | VERTICAL DIRECTION PRINTING START TIMING Tv (msec) | COMPULSORY LASER EMISSION TIMING Ton (μsec) |
|---|---|---|---|---|---|---|
| 600 | 15.0 | 187.1 | 63.4 | 100.2 | 43.7 | 608.1 |
| 400 | 15.0 | 280.6 | 142.6 | 66.8 | 35.7 | 405.3 |

IMAGE FORMING APPARATUS

This application is based on an application No. H10-096987 filed in Japan, the contents of which are hereby incorporated by reference.

BACKGROUND OF THE INVENTION

1. Field of the Invention

The present invention relates to an image forming apparatus comprising an image forming unit and a main controlling unit which can be loaded to be removable to this image forming unit in order to control the image forming unit.

2. Description of the Related Arts

An image forming apparatus is structured by an image forming unit and a main controlling unit for controlling the image forming unit. The image forming unit, which is called in this field "print engine", comprises a sheet feeding device, a photosensitive drum, a laser scanning device, a developing device, a transferring device, a fixing device and a sub-controller, etc. and forms an image on the sheet supplied thereto. The main controlling unit controls indirectly or directly each part of the image forming unit via the sub-controller explained above. The main controlling unit is called in this field "print controller".

When a new type image forming apparatus is developed, the image forming unit and main controlling unit are developed, in many cases, at different developing sections or places. It is natural that in respective specifications of above two units, various contents, such as resolution, image clock frequency, system speed, time from horizontal synchronous signal to beam emission, time from vertical synchronous signal to beam emission and number of rotations of an optical beam deflecting means are determined in detail. The work for determining such specifications and developing works are repeated in many times for every type of apparatus and the resultant cost and time used for development becomes very enormous.

Moreover, if an image forming unit or main controlling unit fails or becomes inoperative because of its life span, many units of a new apparatus obtained at that time have different specifications and therefore the newly obtained unit cannot be connected to the other unit. Even if it may be connected, size of image is different from the preceding image or an image is printed in difference positions in almost every case. Accordingly, it has substantially been impossible to replace the defective unit or the unit manufactured for a new type of apparatus.

Therefore, customers have to purchase a new image forming apparatus and scrap the old image forming apparatus, even if one or another unit can operate normally. As described above, here rises a problem that customers are not only shared excessive cost but also given the increased load to maintain the environmental condition due to scrapping of the old image forming apparatus.

In the image forming apparatus, units or devices thereof are operated with each other by keeping the adequate timing. Japanese Published Unexamined Patent Applications, HEI 5-197263, HEI 5-176130, HEI 5-130335, HEI 6-143698, HEI 5-208522, HEI 4-013364 and HEI 4-296779 disclose the techniques about the operation timing of the unit or device.

For example, the Japanese Published Unexamined Patent Application No. HEI 5-197263 discloses an example that relationship among image clock frequency, number of rotations of polygon mirror and amount of laser beam are changed without change of system speed in the case of changing resolution, an example that relationship among image clock frequency, system speed and amount of laser beam is changed without change in number of rotations of polygon mirror and an example that relationship among number of rotations of polygon mirror, system speed and amount of laser beam is changed without change of image clock frequency. Here, combination of system speed, image clock frequency, number of rotations of polygon mirror and horizontal/vertical direction printing start timing is fixed and resolution is changed by changing such fixed value.

Moreover, the Japanese Published Unexamined Patent Application No. HEI 5-176130 discloses an example that the number of rotations of polygon mirror and laser beam emission timing are changed depending on the communication system G3 and G4 of a facsimile apparatus. Here, combination of the system speed, image clock frequency, number of rotations of polygon mirror and horizontal/vertical direction printing start timing in each resolution is fixed.

The inventions disclosed in above Japanese Published Unexamined Patent Applications does not deal with the subject of the present invention explained above and the image clock frequency, resolution, system speed, horizontal direction printing start timing, vertical direction printing start timing and number of rotations of optical beam deflecting device are previously determined for the main controlling unit and image forming unit. Therefore, if the image forming unit, for example, fails, it cannot be replaced with the image forming unit of the other type of apparatus.

SUMMARY OF THE INVENTION

The present invention is intended to provide an image forming apparatus which can combine an image forming unit and a main controlling unit of different types of image forming apparatus.

Moreover, the present invention is intended to provide an image forming apparatus which can automatically set various numerical data by transferring, between the image forming unit and main controlling unit, various pieces of information regarding image clock frequency, resolution, system speed, horizontal direction printing start timing, vertical direction printing start timing and number of rotations of optical beam deflector.

In addition, the present invention is also intended to provide an image forming apparatus which allows a user to replace either old image forming unit or old main controlling unit by the new corresponding unit.

The present invention is further intended to provide an image forming apparatus which assures the printing without any change of image size and deviation of the image writing position even when only one unit is replaced with the unit of the other type of apparatus.

The present invention is moreover intended to reduce economical sharing of user who is purchasing a new image forming apparatus and load on environmental condition due to scrapping of old apparatus.

Furthermore, the present invention is also intended to provide an image forming apparatus which does not require, at the time of developing a new type apparatus, any adjustment of specifications of the image forming unit and main controlling unit and thereby can reduce the load of development from the viewpoint of time and cost.

The image forming apparatus of the present invention comprises a main controlling unit for transmitting an image data synchronously with an image clock, an image forming unit for outputting an image as a visible image on the basis of the image data transmitted from the main controlling unit, a detector for detecting that the main controlling unit and image forming unit are connected, a communication device for transferring a control data between the main controlling unit and image forming unit and a sub-controller for obtaining the information regarding the image clock via the communication device responding to detection by the detector and also calculating the operating conditions of the image forming apparatus using the information regarding the obtained image clock.

Other objects and advantages besides those discussed above shall be apparent to those skilled in the art from the description of preferred embodiments of the invention which follows. In the description, reference is made to accompanying drawings, which from a part thereof, and which illustrate an example of the invention. Such example, however, is not exhaustive of various embodiments of the invention, and therefore reference is made to the claims which follow the description for determining the scope of the invention.

BRIEF DESCRIPTION OF THE DRAWINGS

The accompanying drawings, which are incorporated in and constitute apart of the specification, illustrate embodiments of the invention and together with the description, serve to explain the principle of the invention.

FIG. 12 is a table for calculating conditions which must be satisfied by the image forming unit A responding to the requirement of the main controlling unit A.

FIG. 13 is a table for calculating conditions which must be satisfied by the image forming unit B responding to the requirement of the main controlling unit A.

FIG. 14 is a table for calculating conditions which must be satisfied by the image forming unit A responding to the requirement of the main controlling unit B.

FIG. 15 is a table for calculating conditions which must be satisfied by the image forming unit B responding to the requirement of the main controlling unit B.

DESCRIPTION OF THE PREFERRED EMBODIMENTS

Figure 1:
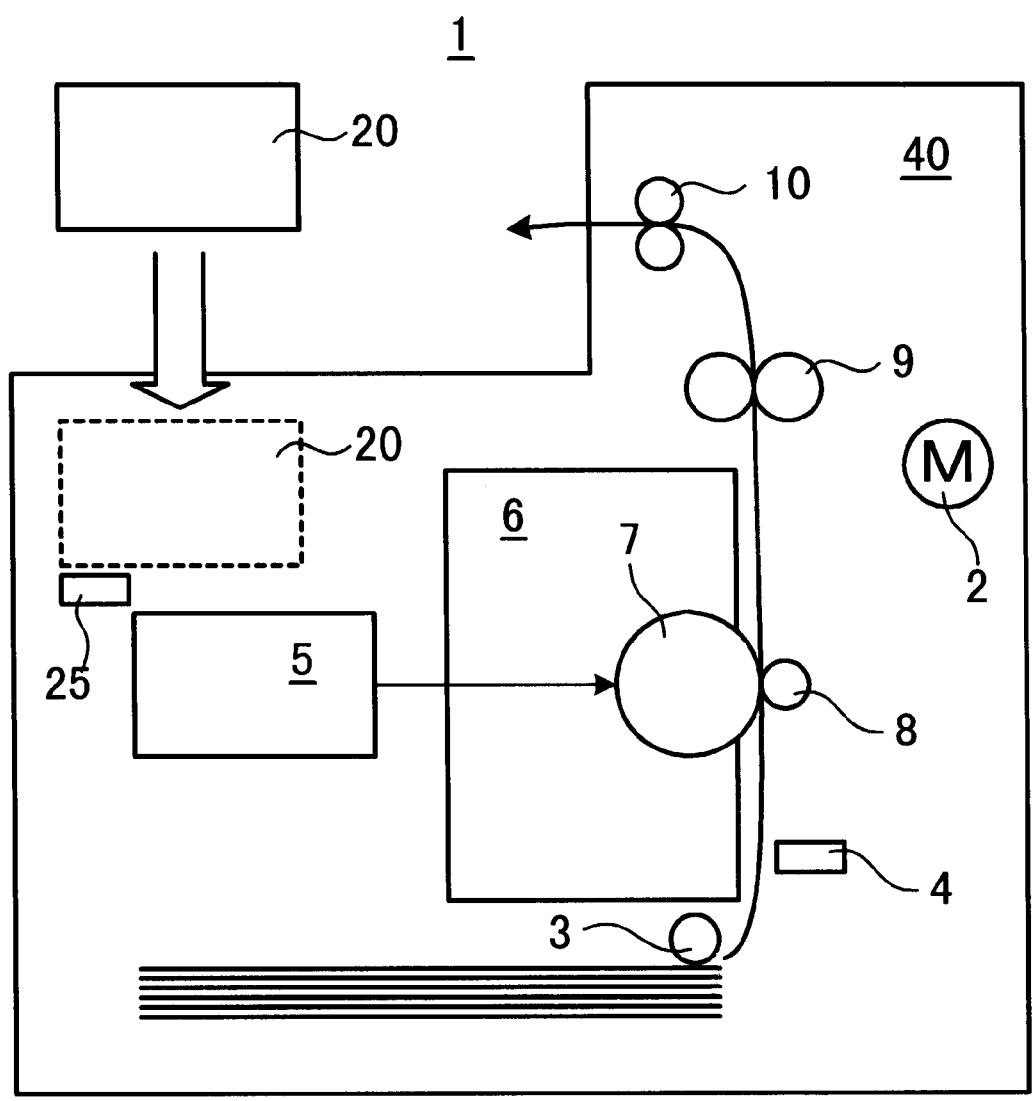
FIG. 1 is a diagram showing an outline of an image forming apparatus used in common in the embodiments of the present invention.

FIG. 1 is a diagram showing an outline of an image forming apparatus common to embodiments of the present invention.

The image forming apparatus 1 of the present invention comprises an image forming unit 40 and a main controlling unit 20. The image forming unit 40 is provided with a main motor, for example, a stepping motor 2. This main motor 2 drives sheet feeding roller 3, print processing unit 6, photosensitive drum 7, transferring roller 8, fixing roller 9 and sheet discharging roller 10, etc.

When printing operation starts, the main motor 2 rotates in the predetermined speed and thereby the sheet feeding roller 3 starts feeding of the sheet.

When a sheet edge traverses the sheet edge sensor 4, the sheet edge sensor 4 detects the sheet edge. At the predetermined time after the detection of sheet edge, a laser scanning device 5 scans the surface of the photosensitive drum 7 with the laser beam modulated depending on the image data. With irradiation of laser beam, a latent image is formed on the surface of the photosensitive drum 7.

A toner image is formed on the photosensitive drum 7 by a developing device provided within the print processing unit 6 and the sheet passes the area between the photosensitive drum 7 and transferring roller 8. Thereby, a toner image is transferred on the sheet.

The sheet on which a toner image is transferred is then subjected to the fixing process by the fixing roller 9 and is then discharged to the outside of the image forming apparatus 1 by the sheet discharging roller 10.

Figure 2:
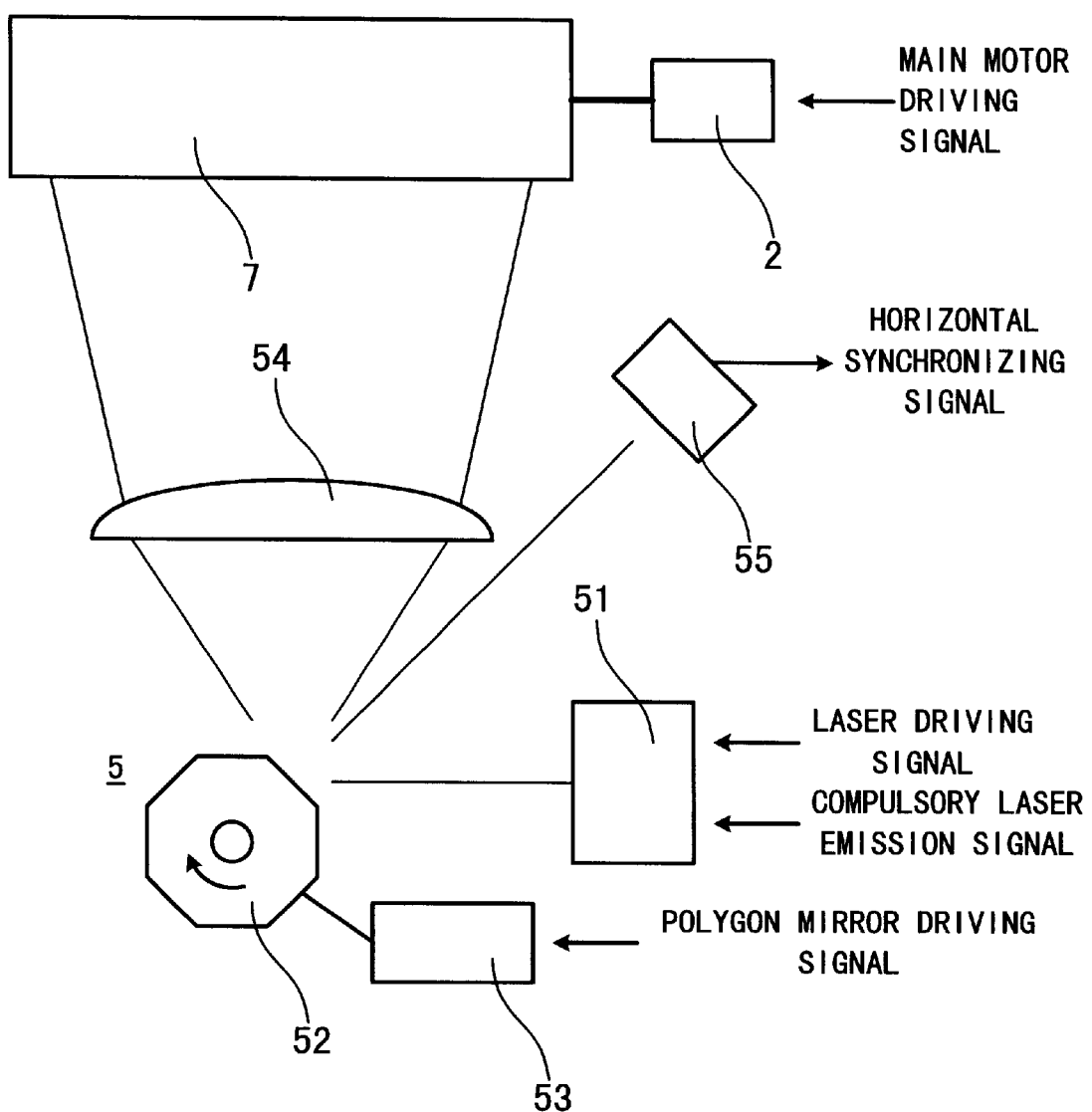
FIG. 2 is a diagram for explaining relationship between a laser scanning device 5 and a photosensitive drum 7.

FIG. 2 is a diagram for explaining the relationship between the laser scanning device 5 and the photosensitive drum 7.

The laser scanning device 5 is mainly composed of a laser driving device 51, a polygon mirror 52, a polygon mirror driving device 53, an fθ lens 54 and a laser beam detecting device 55.

The laser driving device 51 controls emission of laser beam to ON or OFF state depending on the laser driving signal transmitted from the main controlling unit 20. The laser driving signal is sent to the laser driving device 51 so that an image is written to the predetermined position after the predetermined time has passed from the horizontal synchronizing signal generated by the laser beam detecting device 55.

The ON/OFF timing of this laser driving signal is determined on the basis of the image clock generated by an image clock generating circuit (described later).

Moreover, the horizontal synchronizing signal explained above can be obtained by the process that a compulsory laser emission signal is inputted to the laser driving device 51 after the desired time has passed from descending of the preceding horizontal synchronizing signal and the laser beam generated is then incident on the laser beam detecting device 55.

A polygon mirror 52 is driven by a polygon mirror driving device 53. The number of rotations of polygon mirror is determined by the frequency of polygon mirror driving signal outputted from a sub-controller 30 (described later).

The laser beam generated from the laser driving device 51 is reflected by the polygon mirror 52 and scans the surface of photosensitive drum 7 at the constant speed depending on the number of rotations of the polygon mirror after it has passed the fθ lens 54.

Meanwhile, the photosensitive drum 7 is rotated in the predetermined speed by the main motor 2. The main motor 2 is driven by the main motor driving signal.

As explained above, the laser beam scans in two-dimension the photosensitive drum 7 in the predetermined speed. The laser beam irradiating position on the surface of photosensitive drum 7 is determined by the horizontal synchronizing signal supplied from the laser beam detecting device 55 and the vertical synchronizing signal supplied from the sheet edge sensor 4.

The image timing indicates the timing when the laser beam is incident on a point of the pixels forming an image.

Figure 3:
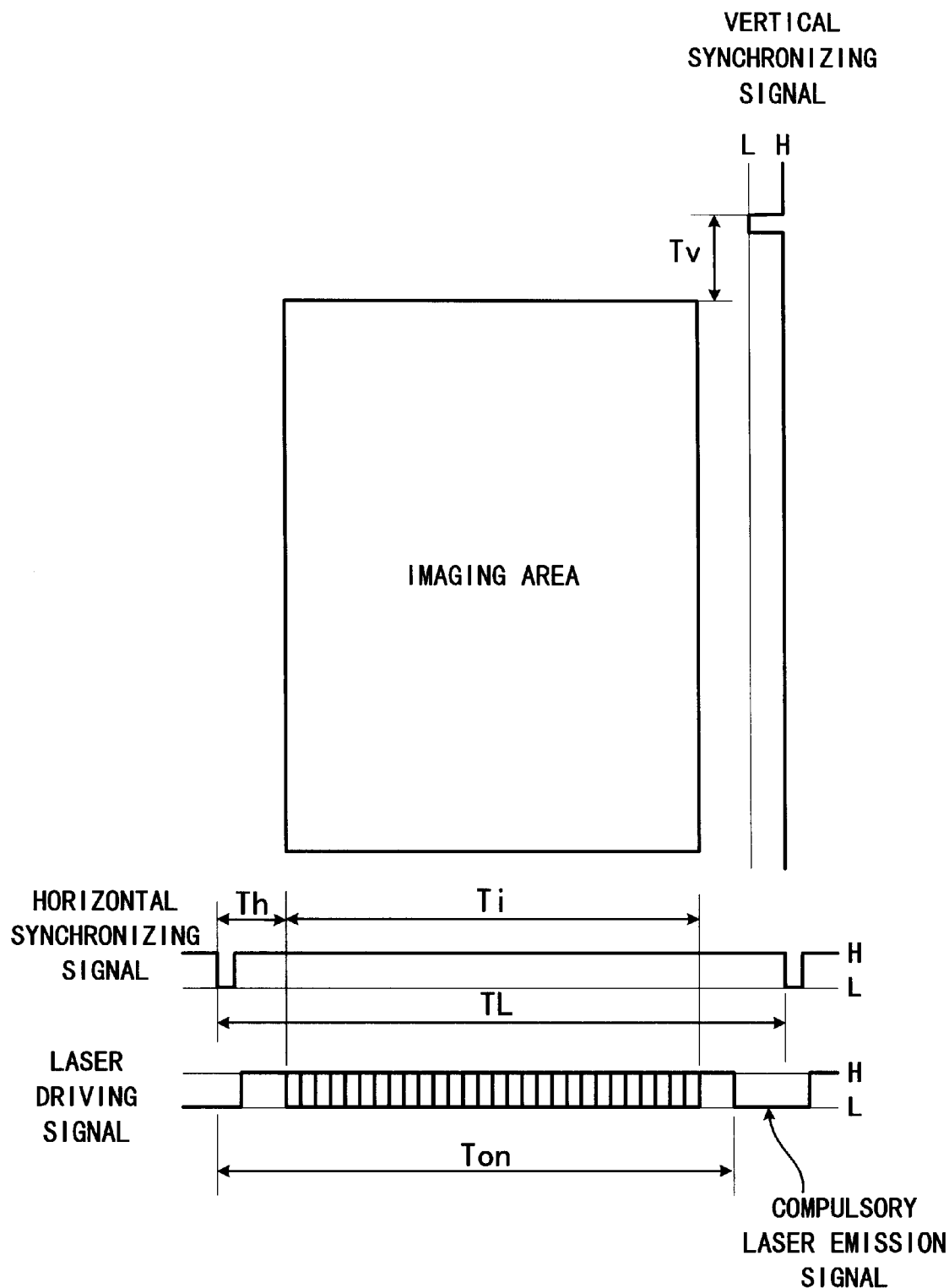
FIG. 3 is a timing chart for explaining the image timing.

At the lower side of FIG. 3, the image timing in the horizontal direction is indicated, while at the right side, the image timing in the vertical direction is indicated. The time passes, in this figure, to the lower side from the upper side and also passes to the right side from the left side.

During very short period of time for incidence of laser beam to the laser beam detecting device 55, an output voltage of the laser beam detecting device 55 changes to the L level from the H level. The descending edge of this output is the horizontal synchronizing signal. When the laser beam is controlled for ON/OFF states after the time Th from the horizontal synchronizing signal, a latent image is formed at the point on the surface of the photosensitive drum 7 where is irradiated with the laser beam depending on the ON/OFF states thereof.

When width of imaging area is defined as Li (mm), image clock frequency as F (MHz), resolution in both main scanning direction (horizontal direction in FIG. 3) and sub-scanning direction (vertical direction in FIG. 3) as R (dpi), the scanning time Ti of the imaging area per line scanning can be expressed by the formula (1).

$$Ti = R \times (Li/25.4)/F (\mu sec) \quad (1)$$

In the same manner, when distance up to the scanning start position of the imaging area from the descending position of the horizontal synchronizing signal is defined as Lh(mm), the time Th(timing for starting the printing in the horizontal direction) up to the start of scanning in the imaging area from the descending point of the synchronizing signal is expressed by the formula (2).

$$Th = R \times (Lh/25.4)/F (\mu sec) \quad (2)$$

A line scanning time TL can be expressed by the formula (3) using resolution R (dpi) when the photosensitive drum driving speed (system speed) is defined as Vs (mm/sec).

$$TL = (25.4 \times 10^6/Vs)/R (\mu sec) \quad (3)$$

The number of rotations Np (rps) of polygon mirror is expressed by the formula (4) when the number of surfaces of polygon mirror is defined as m (surfaces).

$$Np = 10^6/(TL \times m) (rps) \quad (4)$$

Moreover, the formula (5) can be led from the formulae (3) and (4).

$$Np = (R \times Vs)/(25.4 \times m) (rps) \quad (5)$$

Here, relationship among the single line scanning time TL, the scanning time Ti of imaging area per single line scanning and the scanning time Th up to start of scanning of imaging area from the descending edge of the horizontal synchronizing signal is always in the proportional relation, following formulae can be obtained.

$$Ti = k1 \times TL \quad (6)$$

$$Th = k2 \times TL \quad (7)$$

Moreover, the timing for compulsory laser emission output from the sub-controller for detection of laser position means the scanning time Ton up to the compulsory laser emission start position from the descending position of the horizontal synchronizing signal and it can be expressed as follow.

$$Ton = k3 \times TL \quad (8)$$

Here, the formula (9) can be obtained from the formulae (1) and (6).

$$TL = R \times (Li/25.4)/F/k1 (\mu sec) \quad (9)$$

Next, the time (timing for starting the printing in the vertical direction) Tv required for feeding of sheet up to the scanning start position in the imaging area from the descending position of the vertical synchronizing signal is determined by the system speed Vs and is expressed by the formula (10).

$$Tv = f(Vs)(\mu sec) \quad (10)$$

Here, the image forming unit is provided with a main controlling unit A and when the image clock frequency of the main controlling unit A is Fa and resolution thereof is Ra, the single line scanning time TL is necessarily determined by the formula (9) since the width Li of imaging area is determined by the sheet width.

When TL is determined, the number of rotations Np of the polygon mirror is also determined by the formula (4) and moreover the system speed Vs is determined by the formula (5). In addition, the time Th up to the start of scanning of imaging area from the descending point of the horizontal synchronizing signal is determined by the formula (7), while the time Tv (for sheet feeding) up to the start of scanning of imaging area from the descending point of the vertical synchronizing signal is determined by the formula (10) and the time Ton up to the start of compulsory laser emission from the descending point of the horizontal synchronizing signal is determined by the formula (8).

As described above, when the image clock frequency and resolution are determined, since the number of surfaces m of polygon mirror, proportional constants k1, k2, k3 are generally different in design of optical system depending on the image forming unit, TL, Th, Vs and Tv are also different in every image forming unit.

When the image forming unit A is assumed to be connected to the main controlling unit, if the system speed Vs of the image forming unit is determined to a constant value, the image clock frequency Fa, number of rotations Np of the polygon mirror, time Th up to the start of scanning in the imaging area from the descending point of the horizontal synchronizing signal, time Tv (for sheet feeding) up to the start of scanning in the imaging area from the descending point of the vertical synchronizing signal and time Ton up to the start of compulsory laser emission from the descending point of the horizontal synchronizing signal for the printing in the resolution Ra are all determined.

As described above, when some of the values Ra, Fa, Vs, Th, Tv are determined, all conditions are determined.

In the present invention, the information about the Ra, Fa, Vs, Th, Tv, Np, and Ton is shared with the sub-controller of the image forming unit and the main controlling unit by exchanging the necessary data with each other through communication line, e.g. serial communication line.

Embodiment 1

Figure 4:
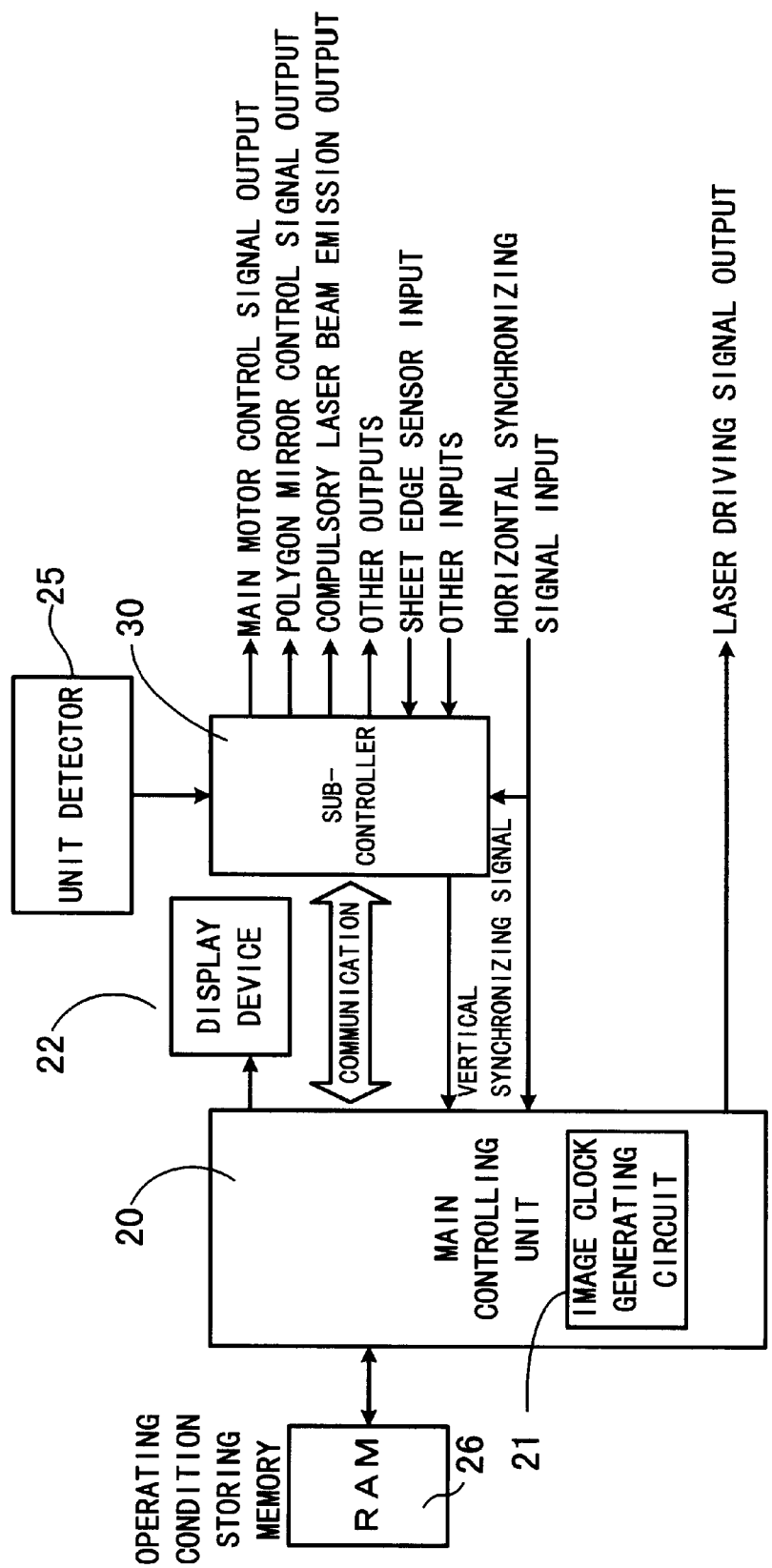
FIG. 4 is a block diagram of an image forming apparatus of embodiment 1.

FIG. 4 is a block diagram of the image forming apparatus as the embodiment 1.

The image forming apparatus 1 of the present invention is provided in removable with the main controlling unit 20

(refer to FIG. 1). The print data from the host computer (not illustrated) is received by the main controlling unit 20 and is then converted to the image data for driving the laser in order to drive the laser in the image forming unit.

The image forming unit comprises the sub-controller 30 to control input and output of each device of the image forming unit and thereby it controls the devices while making communication with the main controlling unit 20.

The main controlling unit 20 is provided with an image clock generating circuit 21 for generating the image clock of the predetermined frequency. During the printing operation, the laser driving signal is outputted from the main controlling unit 20 depending on the image, in the timing of the image clock from the horizontal synchronizing signal and the vertical synchronizing signal from the sub-controller 30.

On the other hand, the sub-controller 30 outputs the polygon mirror control signal as the clock of frequency corresponding to the number of rotations of polygon mirror to rotate the polygon mirror driving device (motor) 53 in the predetermined number of rotations and also the main motor signal as the clock of frequency corresponding to the system speed to rotate the main motor 2 to drive the photosensitive drum 7 in the predetermined system speed. Moreover, the compulsory laser emission signal is also outputted to generate the horizontal synchronizing signal.

In addition, the sub-controller 30 also outputs to the main controlling unit 20 the vertical synchronizing signal to set the timing in the vertical direction with an input from the sheet edge sensor 4.

A display device 22 is controlled to display the condition of the image forming apparatus (printer) 1 from the main controlling unit 20.

Figure 5:
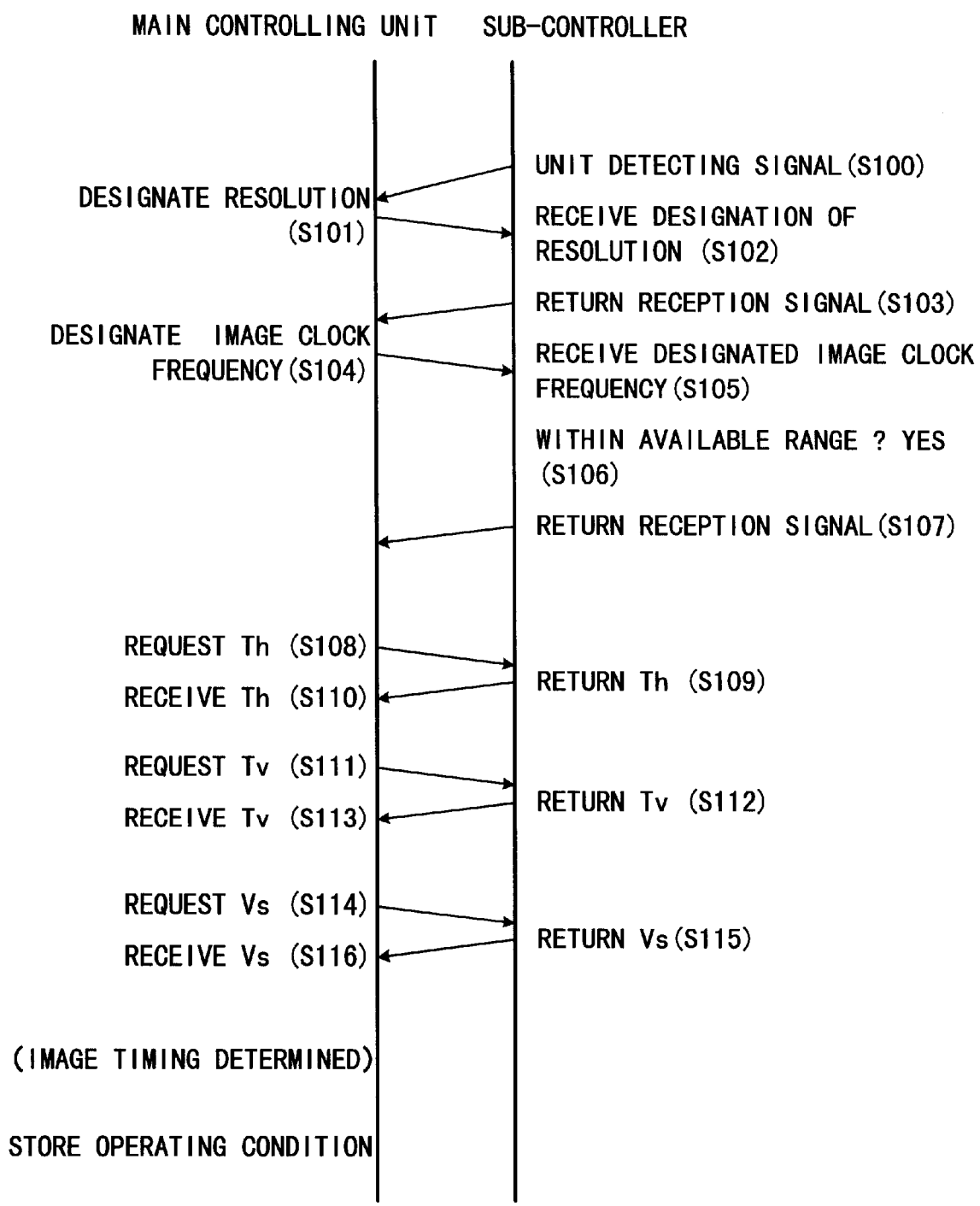
FIG. 5 is a diagram showing information communication procedures in the embodiment 1.
Figure 6:
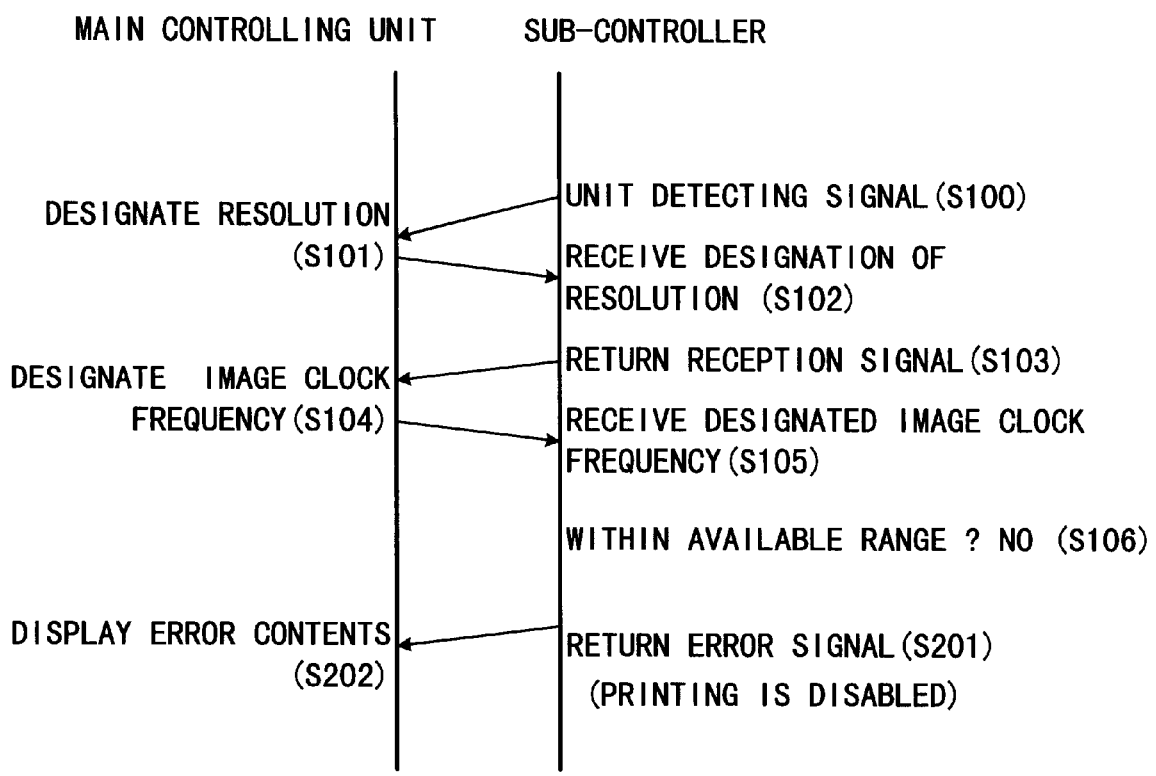
FIG. 6 is a diagram showing information communication procedures in the embodiment 1 when an error is generated.

FIG. 5 and FIG. 6 are diagrams showing the information communication procedures in the embodiment 1.

First, when the power switch is turned ON, the sub-controller 30 detects, in the step S100, that the main controlling unit 20 is set with a unit detector 25 and then sends the unit detecting signal to the main controlling unit 20.

In the step S101, the main controlling unit 20 designates the resolution to the sub-controller 30. The sub-controller 30 receives, in the step S102, the resolution designating information and then returns a message for the end of reception in the step S103.

Upon reception of the returning signal for the end of reception from the sub-controller 30, the main controlling unit 20 designates the image clock frequency in the step S104.

Upon reception of the image clock frequency in the step S105, the sub-controller 30 obtains, by calculation, in the step S106, the number of rotations of polygon mirror, system speed (driving speed of main motor 2), horizontal direction printing start timing and compulsory laser emission timing and then checks whether the system speed and number of rotations of polygon mirror, etc. are within the available range of the image forming unit or not.

As a result, when the number of rotations of the main motor 2 and polygon mirror are within the available range, the usual message for the end of reception is returned in the step S107.

If the result of check is not within the range explained above, contents of error generation is returned in the step S201 as an error message (FIG. 6).

Error generation contents (messages) include upper limit over of the number of rotations of polygon mirror, lower limit under of the number of rotations of polygon mirror, upper limit over of rotating speed of the main motor and lower limit under of the rotating speed of the main motor.

If an error is generated in the resolution designation and image clock frequency designation from the main controlling unit 20, the main controlling unit 20 displays (S202) error generation content on the display device 22. In this case, the printing operation is disabled.

When the resolution and image clock frequency are designated without any error from the main controlling unit 20, this unit 20 takes, in the steps S108 to S116, the horizontal direction printing start timing Th, vertical direction printing start timing Tv and system speed Vs from the sub-controller 30.

As the information of horizontal direction printing start timing Th, the number of dots of the image corresponding to the time may be used in addition to the time ($\mu$sec) information. As the vertical direction printing start timing Tv, the number of image lines corresponding to the time may be used in addition to the time (msec) information. As the system speed Vs, single line scanning time TL which may be converted to the speed may also be used in addition to the speed (mm/sec).

Moreover, in place of the various pieces of information Th, Tv, Vs, the information such as k1, k2, m which are bases for obtaining Th, Tv, Vs may also be used.

With the procedures described above, various pieces of information, such as resolution R=Ra (dpi), image clock frequency F=Fa (MHz), number of rotations of polygon mirror Np=Npa (rps), horizontal direction printing start timing Th=Tha () system speed Vs=Vsa (mm/sec), compulsory laser emission timing Ton=Tona ($\mu$sec) can be determined between the main controlling unit A and sub-controller A in the case of the combination, for example, of the main controlling unit A and image forming unit A. The conditions defined are stored in the operating condition storing memory RAM 26.

Depending on these conditions, the main controlling unit A and sub-controller A perform the printing operation. The main controlling unit A outputs the laser driving signal corresponding to the image data in the timing of Tha ($\mu$sec) from the horizontal synchronizing signal from the timing of Tva ($\mu$sec) from the vertical synchronizing signal. The engine A controller outputs the polygon mirror control signal depending on the number of rotations Npa (rps) of the polygon mirror, outputs the main motor control signal depending on the system speed Vsa (mm/sec) and outputs the compulsory laser emission signal in the compulsory laser emission start timing Tona ($\mu$sec).

Here, various combinations will be considered under the condition that two kinds of main controlling units A, B and two kinds of image forming units A, B are provided.

Conditions of the main controlling unit A:
  Resolution: 600, 400 dpi
  Image clock frequency:
    18 MHz (for 600 dpi)
    8 MHz (for 400 dpi)
Conditions of the main controlling unit B:
  Resolution: 600, 400 dpi
  Image clock frequency:
    15 MHz (common to 600, 400 dpi)
Conditions of image forming unit A:
  Li=297 mm, k1=0.8, k2=0.1,
  k3=0.91, m=8
  Available range of polygon mirror: 100 to 300 rps
  Available range of system speed: 50 to 100 mm/sec
Conditions of image forming unit B:
  Li=297 mm, k1=0.7, k2=0.15
  k3=0.91, m=8

Available range of polygon mirror: 100 to 300 rps

Available range of system speed: 60 to 100 mm/sec

Here, FIG. 12, FIG. 13, FIG. 14 and FIG. 15 show the results of calculation for the conditions which must be satisfied by respective image forming units regarding the number of rotations of polygon mirror Np, system speed Vs, horizontal direction printing start timing Th, vertical direction printing start timing Tv and compulsory laser emission timing Ton using the conditions of the main controlling unit and the conditions (Li, k1, k2, k3, m) of respective image forming units. This calculation is performed in the sub-controller 30.

In these tables, when the main controlling unit B and the image forming unit A are combined (FIG. 14), it can be understood, as indicated in the area surrounded by a thick line of FIG. 14, that the number of rotations Np of polygon mirror and system speed Vs required by the image forming unit are exceeding the available range for the resolution of 500 dpi.

In this case, as indicated in the step S106 of FIG. 6, the sub-controller 30 obtains the result of error in determination of the operating conditions of the image forming unit and therefore such contents are sent to the main controlling unit 20 and thereby the error contents are displayed on the display device 22 (S202).

In above tables, since the conditions are satisfied in the other examples, the relevant combination may be used.

Embodiment 2

Figure 7:
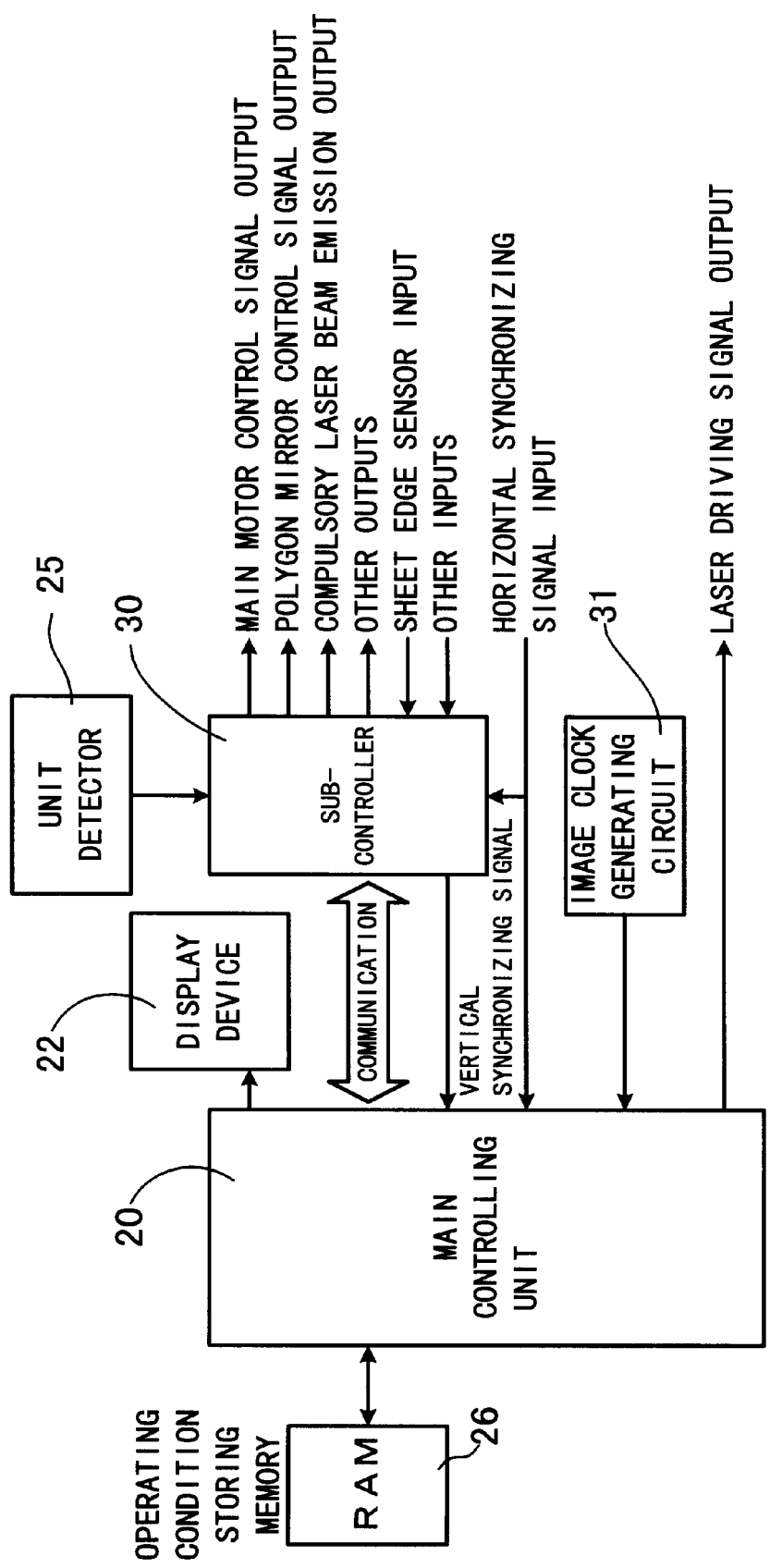
FIG. 7 is a block diagram of an image forming apparatus of embodiment 2.

FIG. 7 is a block diagram of the embodiment 2.

This embodiment 2 is different from the embodiment 1 in the point that the image clock generating circuit 21 is located in the side of the image forming unit.

Figure 8:
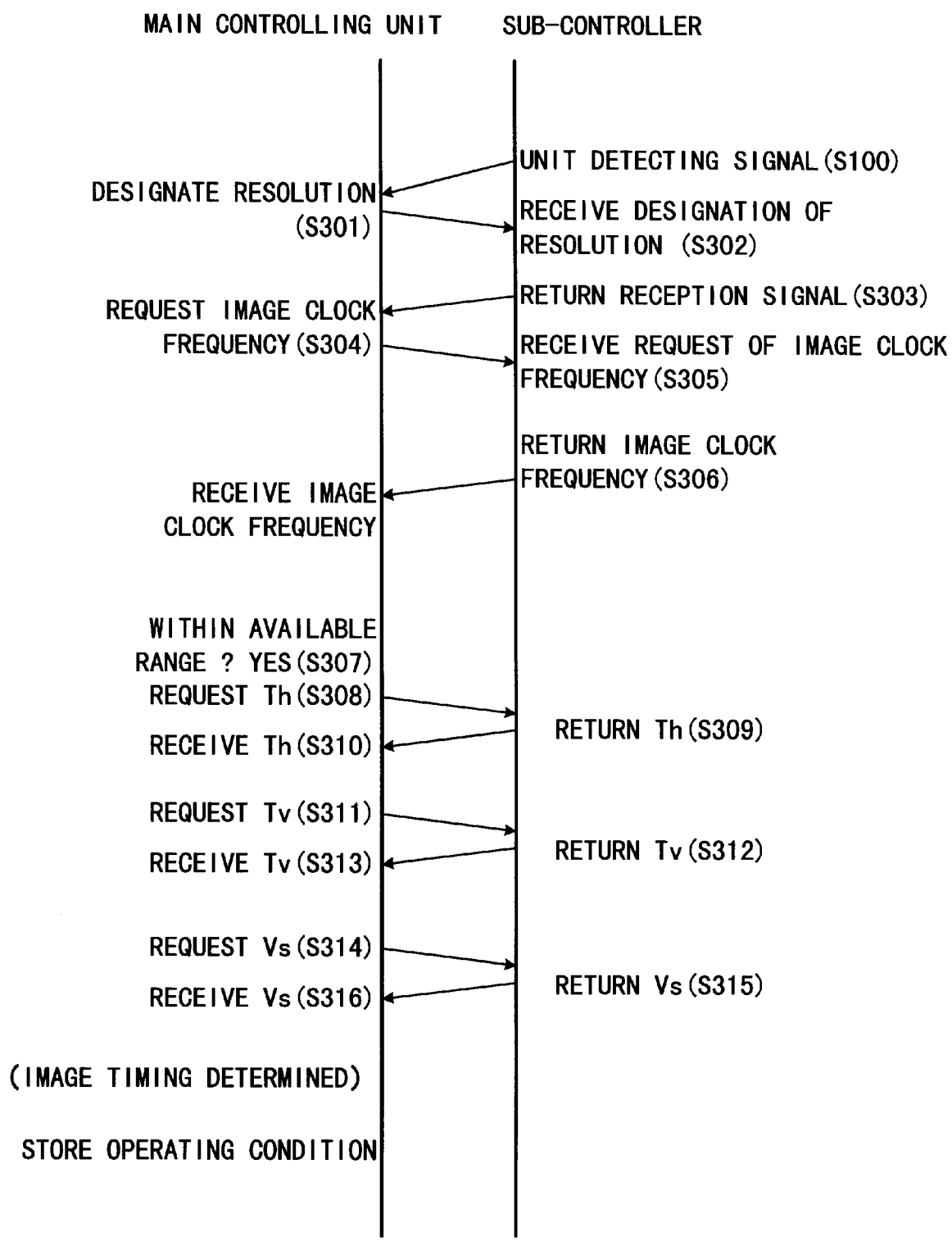
FIG. 8 is a diagram showing information communication procedures in the embodiment 2.
Figure 9:
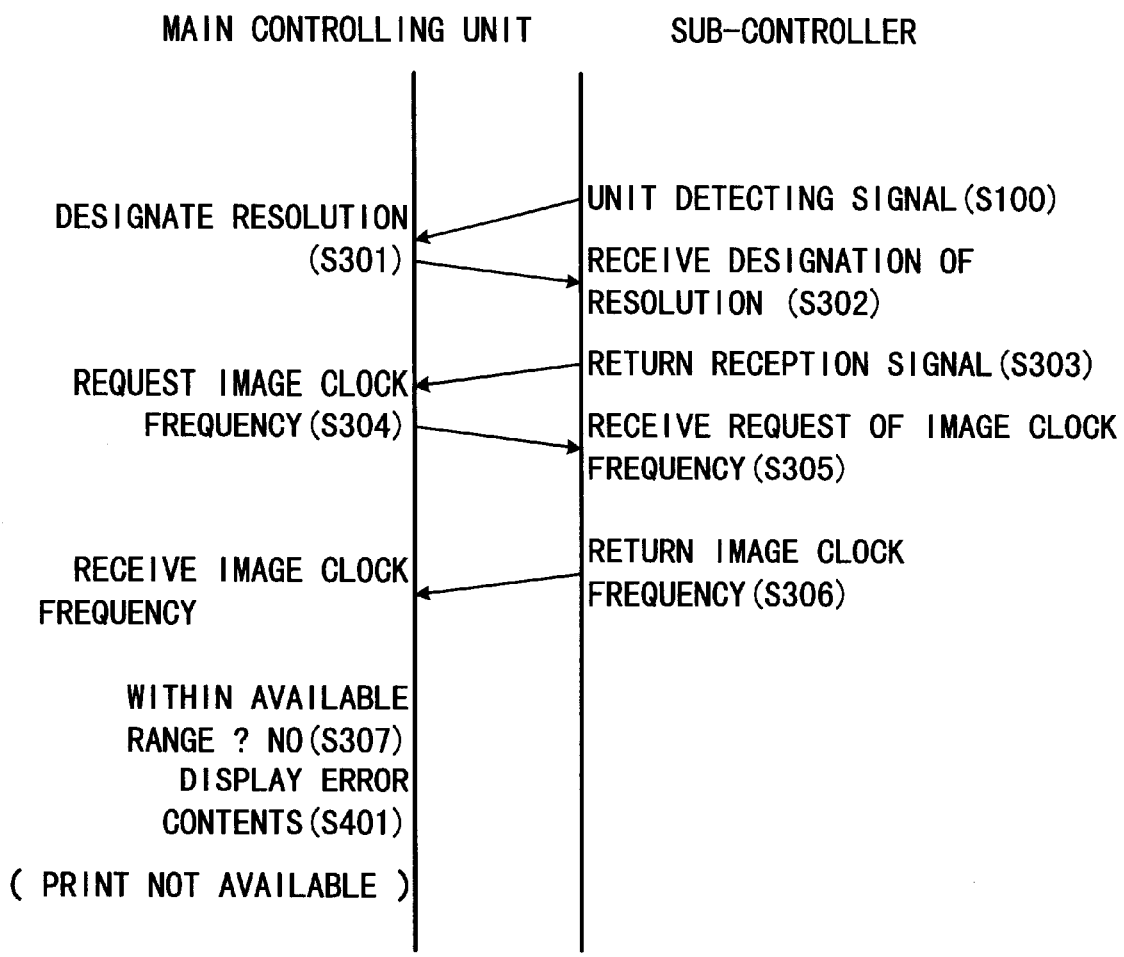
FIG. 9 is a diagram showing information communication procedures in the embodiment 2 when an error is generated.

FIG. 8 and FIG. 9 show the information communication procedures of the embodiment 1.

First, when the power is turned ON, the sub-controller 30 detects with the unit detector 25 that the main controlling unit 20 is set in the step S100 and sends the unit detecting signal to the main controlling unit 20.

In the step S301, the main controlling unit 20 designates resolution to the sub-controller 30.

The sub-controller 30 receives the resolution information in the step S302 and returns the reception end signal in the step S303. In this case, in the sub-controller 30, conditions of the image clock frequency F, number of rotations of polygon mirror Np, system speed Vs, horizontal direction printing start timing Th, vertical direction printing start timing Tv and compulsory laser emission timing Ton are defined. Upon reception of the returning signal from the sub-controller 30, the main controlling unit 20 requests the image clock frequency in the step S305. Upon reception of the image clock frequency in the step S305, the sub-controller 30 returns the image clock frequency which is already defined.

When the image clock frequency is received in the step S307, the main controlling unit 20 checks whether the frequency is in the available range or not. When the frequency is in the available range, operation for common use of information in the subsequent steps of the step S308 is continued (FIG. 8). When the frequency is not in the available range, it is defined as an error and error generation contents are displayed on the display device 22 in the step S401 (FIG. 9). When an error is generated, the printing operation is never performed.

When the image clock frequency is in the available range, the main controlling unit takes, in the steps S308 to S316, the horizontal direction printing start timing Th, vertical direction printing start timing Tv and system speed Vs from the sub-controller.

Thereby, the main controlling unit 20 and sub-controller 30 can use in common the resolution R, image clock frequency F, system speed Vs, horizontal direction printing start timing Th and vertical direction printing start Timing Tv. Accordingly, the printing operation under this condition can be performed.

Here, since the image clock generating circuit 31 is loaded to the image forming unit in the embodiment 2, the image forming unit can keep constant the system speed by setting the image clock frequency to the frequency corresponding to the system speed of the image forming unit. For example, in the case of the image forming unit where the system speed is fixed (a system speed varying means is not provided), an image clock generating means to generate the image clock corresponding to 600 dpi may be loaded to the image forming unit for the image forming unit of 600 dpi and an image clock generating means which can selectively generate the image clock corresponding to 600 dpi and the image clock corresponding to 400 dpi may be loaded to the image forming unit for the image forming unit which can select 600 dpi and 400 dpi.

Embodiment 3

In the first and second embodiments described above, the printing operation is disabled under the certain conditions, however, in this embodiment 3, the printing operation is not disabled and the other printing available conditions are additionally set.

Figure 10:
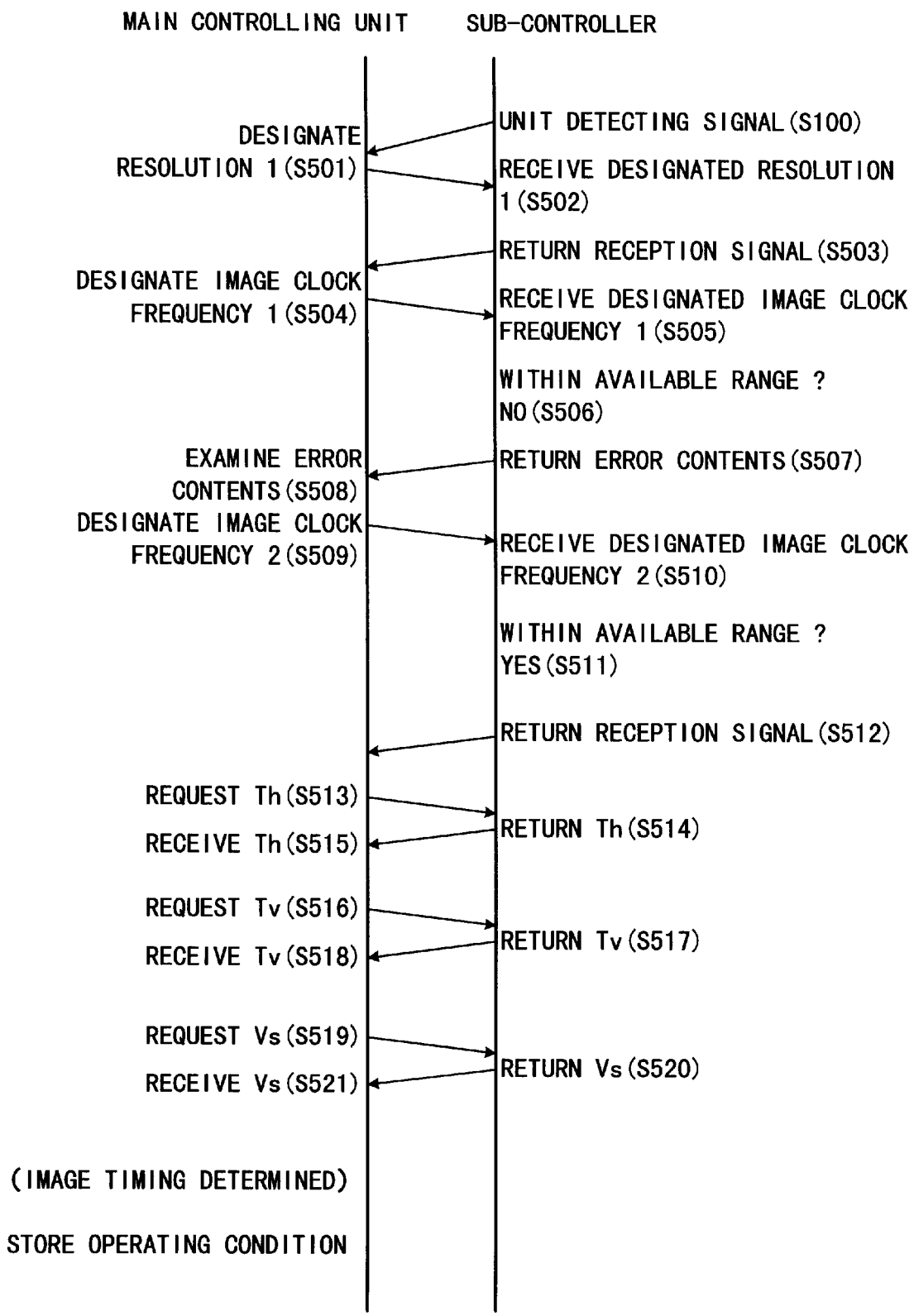
FIG. 10 is a diagram showing information communication procedures in the embodiment 3.

With the same structure as that (FIG. 3) of the main controlling unit and image forming unit in the embodiment 1, signals are exchanged as shown in FIG. 10 between the main controlling unit 20 and sub-controller 30.

First, the main controlling unit 20 designates, in the step S501, the resolution 1 to the sub-controller 30. The sub-controller receives the resolution information in the step S502 and sends the reception end signal in the step S503. The main controlling unit 20 receives a returning signal from the sub-controller 30 and then designates the image clock frequency 1 in the step S504.

Upon reception of the image clock frequency 1 designation in the step S505, the sub-controller 30 obtains, in the step S506, the number of rotations of polygon mirror, system speed, horizontal direction printing start timing, vertical direction printing start timing and compulsory laser emission timing in order to check whether the system speed (main motor driving speed) and number of rotations of polygon mirror should be in the available range or not.

When the main motor and polygon mirror are in the available as a result of above check, remaining information of the steps S513 to S521 are exchanged as in the case of FIG. 5 in the embodiment 1 (not illustrated) and if these are not in the available range, it is defined as an error and the error generation contents are returned in the step S507 (FIG. 10).

Error generation contents include upper limit over of the number of rotations of polygon mirror, lower limit under of the number of rotations of polygon mirror, upper limit over of the main motor rotating speed, and lower limit under of the main motor rotating speed.

The main controlling unit designates the other conditions by determining a measure corresponding to the contents of an error in the step S508. For example, when the system speed is high, the clock frequency is reduced or resolution is raised. Here, as an example, when the clock frequency is changed, the main controlling unit 20 designates the image clock frequency 2 (S509).

Upon reception of the image clock frequency 2 designation in the step S510, the sub-controller obtains again, in the step S511, the number of rotations of polygon mirror, system speed, horizontal direction printing start timing, vertical direction printing start timing and compulsory laser emission timing.

Using the values obtained, it is checked whether the system speed (main motor driving speed) and number of rotations of polygon mirror should be in the available range or not.

As a result, when the main motor and polygon mirror are in the available range, the reception end signal is returned in the step S512 to exchange the information in t he subsequent steps S513 to S521. Moreover, when these elements are not in the available range, it is defined again as an error, the available condition will further be searched in the similar procedures (not illustrated).

If the available condition cannot be found finally, the main controlling unit 20 displays the non-available condition on the display device 22.

Embodiment 4

The other method to determine the printing available condition is explained as the embodiment 4.

Figure 11:
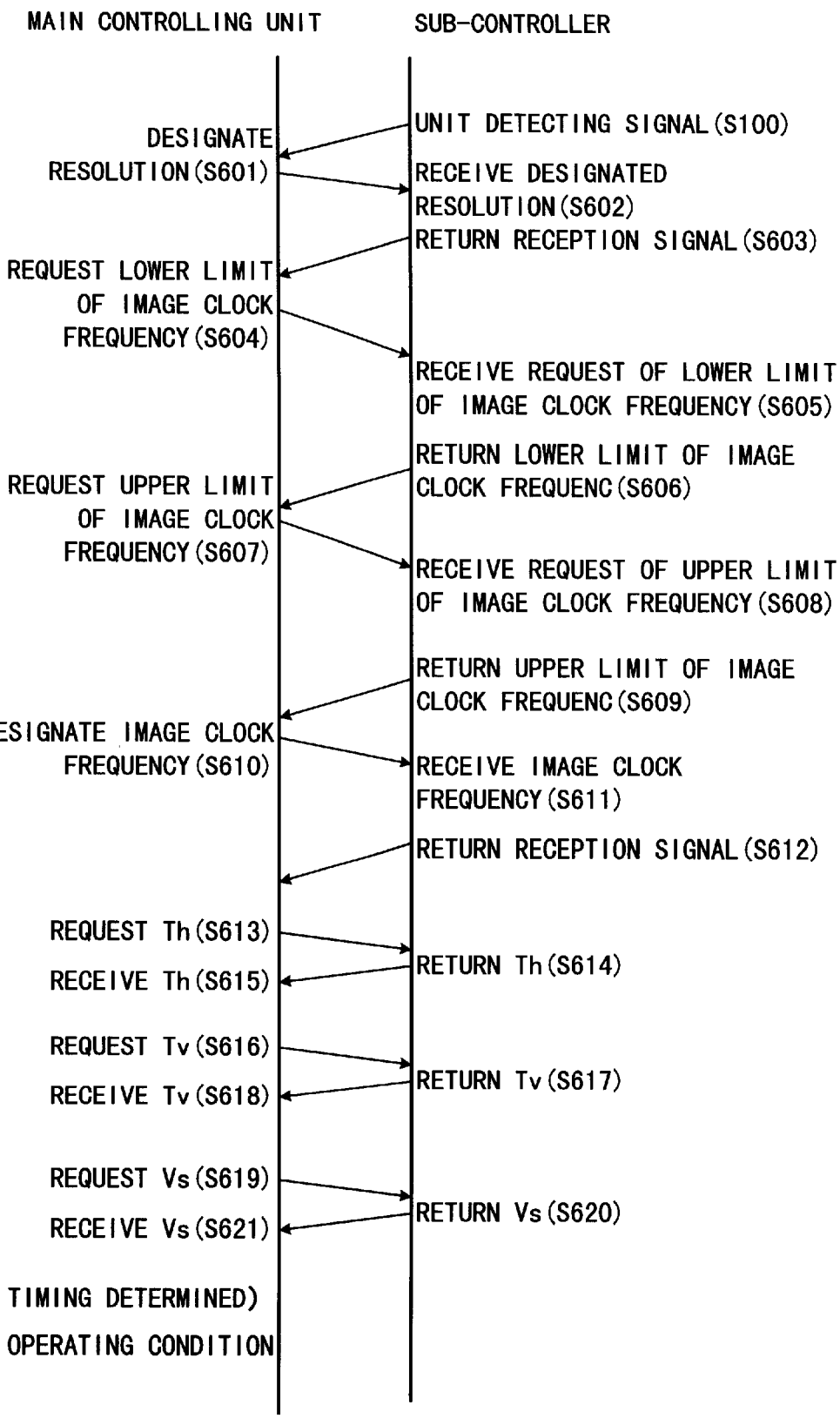
FIG. 11 is a diagram showing information communication procedures in the embodiment 4.

In this embodiment 4, information exchange is performed as shown in FIG. 11 between the main controlling unit 20 and sub-controller 30 in the same structure as that of the main controlling unit and image forming unit (FIG. 3) in the embodiment 1.

First, in the step S601 (FIG. 11), the main controlling unit 20 designates resolution for the sub-controller 30. The sub-controller 30 receives, in the step S602, the resolution information and returns the reception end signal in the step S603.

In this case, the available range of the image clock frequency corresponding to the available range of the number of rotations of polygon mirror and system speed is defined. Upon reception of the return signal from the sub-controller 30, the main controlling unit 20 requests the lower limit of the image clock frequency in the step S604. The sub-controller 30 returns, upon reception of the image clock frequency lower limit request in the step S605, the lower limit value of the image clock frequency in the step S606. The main controlling unit 20 requests the upper limit of the image clock frequency in the step S607 and the sub-controller 30 returns, upon reception of the image clock frequency upper limit request in the step S608, the upper limit value of the image clock frequency in the step S609.

Next, the main controlling unit designates the image clock frequency within the available range in the step 610 by receiving the upper limit of the image clock frequency. Here, if the main controlling unit cannot be used in the available image clock frequency in the side of the image forming unit, it is defined as an error and the non-available condition is displayed on the display device 22 (not illustrated).

Upon reception of the available image clock frequency in the step S611, the sub-controller 30 returns, in the step S611, the reception end signal and also defines the number of rotations of polygon mirror, system speed, horizontal direction printing start timing, vertical direction printing start timing and the compulsory laser emission timing.

Subsequently, the main controlling unit 20 defines the image timing by the processes in the steps S613 to S621.

Each embodiment has been described above but method of information exchange between the main controlling unit 20 and sub-controller 30 is not limited to the method explained above.

For example, it is also possible that the main controlling unit 20 designates, when emphasis is placed on the system speed, the resolution and system speed to the sub-controller 30, while the sub-controller 30, on the other hand, sends the image clock frequency and printing start timing to the main controlling unit 20.

Moreover, for example, as described in the embodiment 1, information such as proportional constants k1, k2 and number of surfaces of polygon mirror m can be exchanged in place of the information such as horizontal direction printing start timing Th, vertical direction printing start timing Tv and system speed Vs.

In addition, it is also possible that some data among the clock frequency, resolution and system speed are standardized to certain values and thereby the main controlling unit can receive the printing start timing which changes depending on design of the image forming unit.

As explained above, since the present invention can automatically set, through communication between the different types of the image forming unit and main controlling unit even in any type of combination, the relationship among the image clock frequency, resolution, system speed, horizontal direction printing start timing, vertical direction printing start timing and number of rotations of optical beam deflector, printing can be enabled without difference in sizes of image and deviation of image writing position.

Accordingly, it is possible for a user to purchase only one unit of the image forming unit and main controlling unit, resulting in the effect that economical load and load on environmental condition due to scrapping can be reduced.

Moreover, in the development of the new type apparatus, adjustment of specifications between the image forming unit and main controlling unit is no longer required, resulting in the effect the load of development from the point of view of time and cost can be much alleviated.

In addition, the invention improves application flexibility because a user can know the condition when combination of the image forming unit and main controlling unit is mismatched.

Further, the system speed can be varied in the image forming unit side, resulting in the effect that a degree of freedom in design of the main controlling unit is increased because the modulation frequency in the main controlling unit side can be set in a certain width.

Moreover, since the system speed of the image forming unit can be fixed because a modulation frequency circuit is equipped in the image forming unit side, the image forming unit can easily be structured.

Finally, the printing available condition is determined automatically according to combination of the main controlling unit and image forming unit, resulting in the effect that application flexibility of apparatus can be as much improved.

Although only preferred embodiments are specifically illustrated and described herein, it will be appreciated that many modifications and variations of the present invention are possible in light of the above teaching and within the purview of the appended claims without departing from the spirit and intended scope of the invention.

What is claimed is:

1. An image forming apparatus comprising:
   main controlling unit for sending an image data in synchronization with an image clock;
   image forming unit for outputting an image as a visible image on the basis of the image data transmitted said main controlling unit;
   detector for detecting that said main controlling unit and said image forming unit are connected;
   communication device for making communication of control data between said main controlling unit and said image forming unit; and sub-controller for obtaining information of image clock via said communication device responding to detection of said detector and also calculating the operation conditions of said image forming apparatus using information about image clock obtained.

2. An image forming apparatus according to claim 1, wherein said sub-controller is provided in said image forming unit to execute image forming operation depending on the calculated operating conditions.

3. An image forming apparatus according to claim 2, wherein said main controlling unit is provided with an image clock generating circuit and said sub-controller obtains information about image clock via said communication device from said main controlling unit.

4. An image forming apparatus according to claim 2, wherein said sub-controller transmits at least one condition of the calculated operating conditions to said main controlling unit.

5. An image forming apparatus according to claim 4, wherein operating conditions transmitted to said main controlling unit include the system speed and printing start timing.

6. An image forming apparatus according to claim 2, wherein said sub-controller obtains information about resolution via said communication device from said main controlling unit and also calculates operating conditions from said information about image clock and said information about resolution.

7. An image forming apparatus according to claim 1, further comprising a determining means for determining whether said calculated operating conditions should be within the operation available range of said image forming unit or not.

8. An image forming apparatus according to claim 7, further comprising a display device for displaying generation of error when said operating conditions are determined by said determining means not to be within the operation available range.

9. An image forming apparatus according to claim 7, wherein said sub-controller sets again the operating conditions within the operation available range when said determining means has determined the conditions are not within the operation available range.

10. An image forming apparatus having an image forming unit including a sub-controller and having a main controlling unit mounted removably to said image forming unit to generate image data, comprising:

image clock generating circuit;

transferring means for transferring image data to said image forming unit from said main controlling unit in synchronization with the image clock generated by said image clock generating circuit;

detector for detecting that said main controlling unit is attached to said image forming unit; and communication controlling means for sharing various pieces of information about operating conditions of resolution, image clock frequency, system speed and printing start timing, responding to detection of attachment by said detector with said sub-controller and said main controlling unit.

11. An image forming apparatus according to claim 10, said image forming unit including:

print processing unit having a photosensitive member;

driving means for driving said photosensitive member in the system speed;

optical beam generator for outputting optical beam depending on image data; and optical beam deflecting means for deflecting said optical beam to scan the photosensitive drum surface; wherein said shared operating conditions include number of rotations of said optical beam deflecting means, time up to generation of optical beam from the vertical synchronizing signal and time up to generation of optical beam from the horizontal synchronizing signal.

12. An image forming apparatus according to claim 10, further comprising a display device for displaying error when the condition in which said main controlling unit or image forming unit is not operable.

13. An image forming apparatus according to claim 10, wherein said communication control means sets the other available operating conditions when the condition in which said main controlling unit or image forming unit is not operable is included.

14. An image forming apparatus according to claim 10, said image clock generating circuit is mounted to said main controlling unit.

15. An image forming apparatus according to claim 10, said image clock generating circuit is mounted to said image forming unit.

16. An image forming apparatus according to claim 10, said system speed is variable.

17. A method for controlling an image forming apparatus comprising an image forming unit having a sub-controller and a main controlling unit which can be mounted removably to said image forming unit to generate an image data, comprising:

step a for detecting that said main controlling unit is attached to said image forming unit;

step b for sharing the operating conditions with said main controlling unit and said sub-controller through communication of the information about the operating conditions concerning said sub-controller and said main controlling unit when said attachment is detected; and step c for transferring image data under the shared operating conditions from said main controlling unit to said image forming unit and then executing the image forming operation with said image forming unit on the basis of the image data transferred.

18. A control method according to claim 17, wherein said step b further comprises the steps from d to f:

step d for sharing the information about the first operating condition with said sub-controller and said main controlling unit through communication;

step e for calculating the second operating condition using the first operating condition; and step f for sharing the information about the calculated second operating condition with said sub-controller and said main controlling unit through communication.

19. A control method according to claim 18, wherein said first operating condition is at least one of the conditions of resolution and image clock frequency.

20. A control method according to claim 17, further comprising a step g for determining whether said shared operating condition should be within the operation available range of said main controlling unit or said image forming unit or not.

* * * * *